(12) United States Patent
Holland

(10) Patent No.: US 11,039,624 B2
(45) Date of Patent: Jun. 22, 2021

(54) DEVICE FOR USE IN THE HUMANE SLAUGHTER OF ANIMALS

(71) Applicant: Accles & Shelvoke Limited, Sutton Coldfield (GB)

(72) Inventor: Joseph Eugene Holland, Sutton Coldfield (GB)

(73) Assignee: ACCLES & SHELVOKE LIMITED, Sutton Coldfield (GB)

( * ) Notice: Subject to any disclaimer, the term of this patent is extended or adjusted under 35 U.S.C. 154(b) by 0 days.

(21) Appl. No.: 16/780,329

(22) Filed: Feb. 3, 2020

(65) Prior Publication Data

US 2020/0245630 A1    Aug. 6, 2020

(30) Foreign Application Priority Data

Feb. 5, 2019   (GB) .................................. 1901582

(51) Int. Cl.
*A22B 3/02*     (2006.01)
*F41A 19/13*    (2006.01)
*F41A 21/12*    (2006.01)

(52) U.S. Cl.
CPC ............... *A22B 3/02* (2013.01); *F41A 19/13* (2013.01); *F41A 21/12* (2013.01)

(58) Field of Classification Search
CPC ..... A22B 3/02; F41A 9/46; F41A 9/47; F41A 19/13; F41A 21/12
USPC ......................................................... 42/1.12
See application file for complete search history.

(56) References Cited

U.S. PATENT DOCUMENTS

| 3,625,153 A | 12/1971 | Furth et al. |
| 3,632,032 A * | 1/1972 | Termet ............... A22B 3/02 227/10 |
| 3,999,485 A | 12/1976 | Ferri |
| 4,086,682 A | 5/1978 | Hancox |
| 4,114,792 A | 9/1978 | Pomeroy |

(Continued)

FOREIGN PATENT DOCUMENTS

| DE | 29622140 U1 | 2/1997 |
| EP | 0197203 A1 | 10/1986 |

(Continued)

*Primary Examiner* — Bret Hayes
(74) *Attorney, Agent, or Firm* — Michael Best & Friedrich LLP

(57) ABSTRACT

A device for use in the humane slaughter of animals has a barrel and a cap arranged for limited reciprocal axial movement and urged to an inoperative position by a spring. A captive bolt is received in the barrel for reciprocal axial movement, the bolt being driven out of the barrel by a driving force provided by an explosive cartridge adapted to be received in a breech in the barrel. The cartridge is fired by striking a firing pin provided in the cap. The cartridge is mounted on a strip movable in response to a manual operation, and a registration device is provided between the strip and the cap to locate the cartridge relative to the open breech in the inoperative position. Movement of the barrel relative to the cap against the force of the spring places the cartridge in the breech and causes it to strike the firing pin to fire the cartridge and operate the captive bolt, the spring then returning the barrel and the cap to the inoperative position to open the breech and allow movement of the strip to remove the spent cartridge.

16 Claims, 4 Drawing Sheets

(56) References Cited

U.S. PATENT DOCUMENTS

| | | | | |
|---|---|---|---|---|
| 4,625,442 | A | * 12/1986 | Hill | A22B 3/02 |
| | | | | 227/10 |
| 4,631,779 | A | * 12/1986 | Castiello | A22B 3/02 |
| | | | | 42/1.12 |
| 5,020,257 | A | 6/1991 | Termet | |
| 5,492,065 | A | 2/1996 | Jena et al. | |
| 5,811,717 | A | * 9/1998 | Day | F42B 39/085 |
| | | | | 206/347 |
| 5,901,894 | A | * 5/1999 | Melocco | B25C 1/14 |
| | | | | 227/10 |
| 6,062,455 | A | * 5/2000 | Giannuzzi | B25C 1/163 |
| | | | | 227/10 |
| 6,547,120 | B1 | * 4/2003 | Popovich | B25C 1/186 |
| | | | | 227/10 |
| 6,974,064 | B1 | * 12/2005 | Chou | B25C 1/186 |
| | | | | 227/10 |
| 7,048,166 | B2 | * 5/2006 | Pfister | B25C 1/186 |
| | | | | 227/10 |

FOREIGN PATENT DOCUMENTS

| | | | |
|---|---|---|---|
| EP | 0560584 | A1 | 9/1993 |
| EP | 0824997 | A1 | 2/1998 |
| EP | 3395175 | A2 | 10/2018 |
| FR | 88419 | E | 2/1967 |
| GB | 1447188 | A | 8/1976 |
| GB | 2097899 | A | 11/1982 |
| GB | 2470421 | A | 11/2010 |

\* cited by examiner

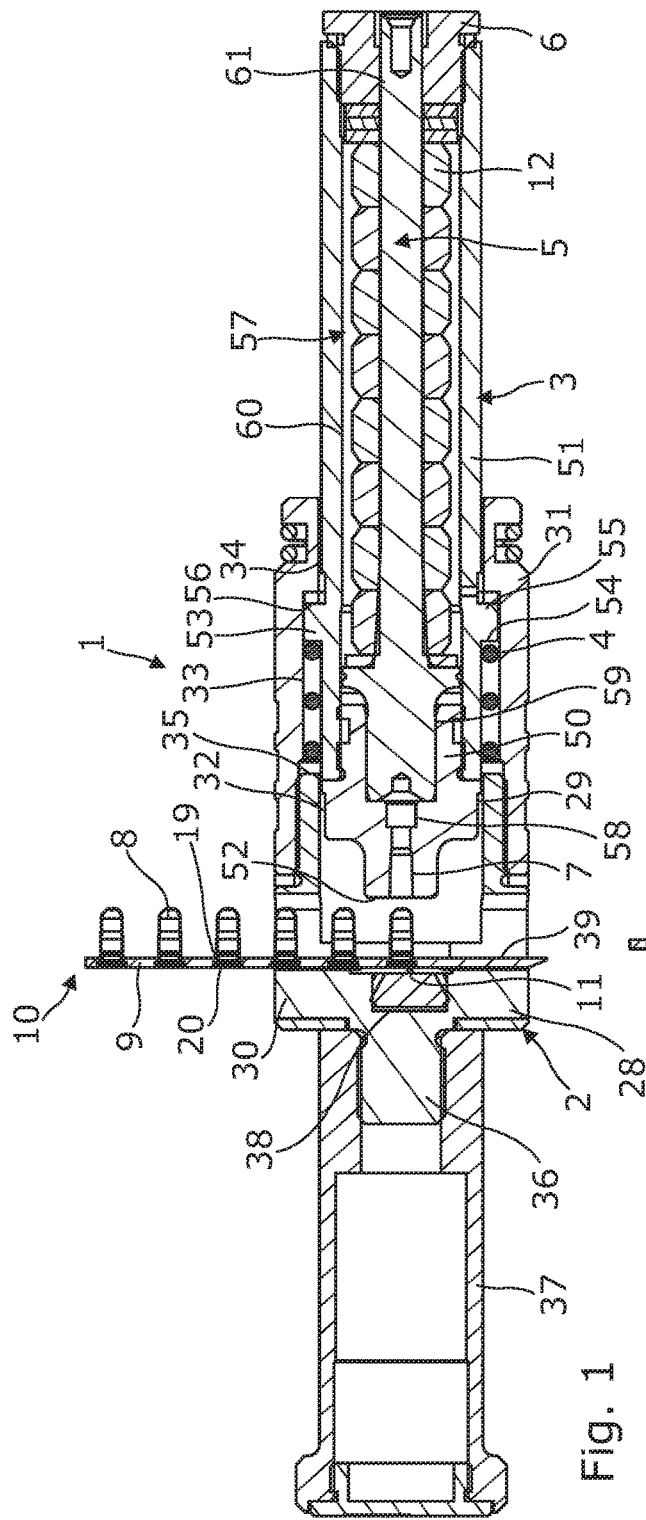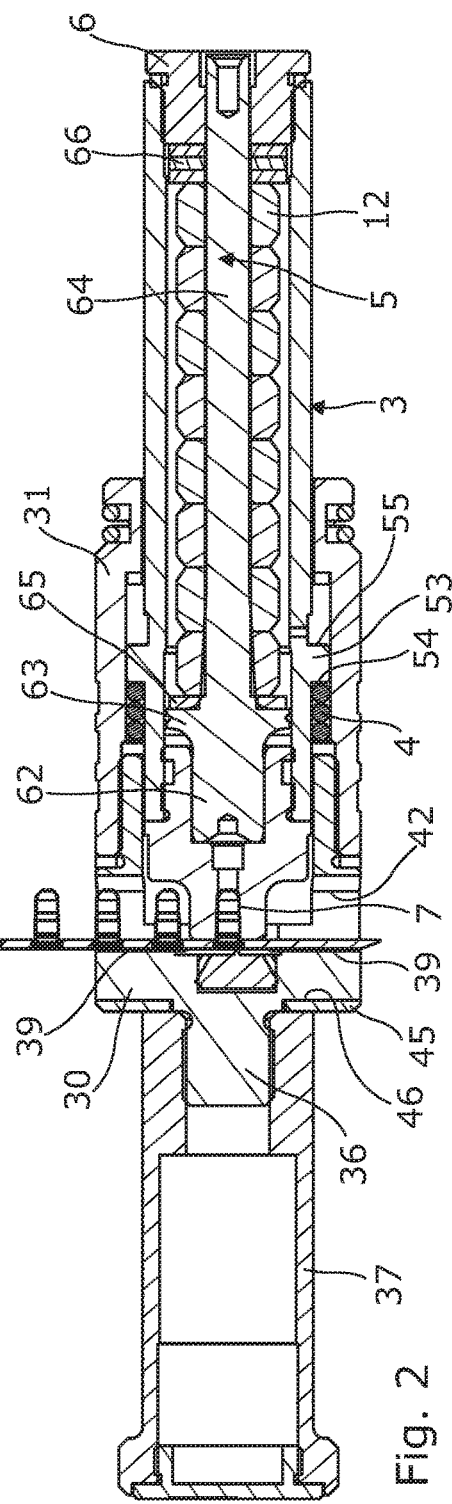

DEVICE FOR USE IN THE HUMANE SLAUGHTER OF ANIMALS

CROSS-REFERENCE TO RELATED APPLICATIONS

The present disclosure claims priority to British Patent Number GB 1901582.5, filed Feb. 5, 2019.

BACKGROUND OF THE INVENTION

Field of the Invention

This invention relates a device for use in the humane slaughter of animals, and in particular a device used to stun an animal prior to slaughter.

Description of Related Art

In such devices a captive bolt housed in a barrel is driven along the barrel by application of a driving force, which may be explosive, pneumatic or hydraulic. The bolt is returned by a return mechanism such as resilient means deformed on the driving stroke. Where the driving force is explosive, it is provided by individual blank cartridges, comprising a brass case containing a propellant and an ignition charge for igniting the propellant when the end of the case is struck by a firing pin. A cartridge is loaded into a breech for each use, and extracted after use so that another one can be loaded. In one type of device the firing pin is actuated by a trigger operating a hammer, and extraction requires pulling back of the hammer to open the breech. In another type of device, known as a contact fire device, the breech is provided in one end of the barrel, which is held in a cap. The firing pin is accommodated in the cap, and when the other end of the barrel is moved towards the cap, it moves the cartridge to strike the firing pin. The cap is removed in order to extract a spent cartridge and load a new one. These devices are safe to use, but can be awkward in use, because of the need to extract and load a cartridge each time by a manual operation. This also makes it relatively time-consuming to use. The spent cases must also be handled carefully, as if they are dropped they can be hazardous to the user or the animals.

For firearms generally it is known to use cartridges loaded into a magazine. Actuation of the trigger brings the next cartridge automatically into a firing position, ready for the next trigger actuation. This enables the firearm to be fired rapidly, which is not required for animal stunning devices, and indeed could be dangerous in an abattoir. Powder-actuated nail guns may also use magazines of blank cartridges, and have an interlock mechanism so that a cartridge is fired only if the forward end of the barrel is in contact with a hard surface and the trigger is actuated. Actuation of the trigger in any other circumstances has no effect at all. These are essential safety features for a nail gun, but are not appropriate for an animal stunning device.

EP 0 197 203 shows an animal stunning device having trigger actuation using a cartridge magazine, where the feeding of the cartridge and resetting of the firing pin are carried out simultaneously by manual operation of a lever which opens and closes the breech. The firing pin is latched by a trigger-operated lever, such that operation of the trigger releases the firing pin but has no effect on the feeding of the cartridge. EP 3 395 175 also shows an animal stunning device having trigger actuation using a cartridge magazine, where the device has a feed mechanism for moving the magazine following operation of the trigger, and a manually-operable arming mechanism arranged to interact with the ignition mechanism, the arrangement being such that an operation of the trigger always actuates the feed mechanism, and actuates the ignition mechanism only if the arming mechanism is operated before that operation of the trigger. This arrangement means that two distinct actions are needed for firing; the operation of the arming mechanism and the operation of the trigger.

There is currently a need for an animal stunning device of the contact fire type which can avoid the need to open the device to extract and reload a cartridge for each use, so that a cartridge magazine can be used, while ensuring safe operation.

BRIEF SUMMARY OF THE INVENTION

According to a first aspect of the invention, we provide a device for use in the humane slaughter of animals having a barrel and a cap arranged for limited reciprocal axial movement and urged to an inoperative position by resilient means, a captive bolt being received in the barrel for reciprocal axial movement, the bolt being driven out of the barrel by a driving force provided by an explosive cartridge adapted to be received in a breech in the barrel and fired by striking a firing pin provided in the cap, the cartridge being mounted on a strip movable in response to a manual operation, and registration means being provided between the strip and the cap to locate the cartridge relative to the open breech in the inoperative position, movement of the barrel relative to the cap against the force of the resilient means placing the cartridge in the breech and causing it to strike the firing pin to fire the cartridge and operate the captive bolt, the resilient means then returning the barrel and the cap to the inoperative position to open the breech and allow movement of the strip to remove the spent cartridge.

This arrangement provides automatic opening and closing of the breech by the relative movement of the barrel and the cap, and avoids the need to open the device to extract and reload a cartridge for each use. It also provides the necessary level of safety, as the spent cartridge is removed and the new one inserted in response to a manual operation, rather than automatically.

Conveniently the strip mounts more than one cartridge, to provide a cartridge magazine. It would be possible for a strip to mount only one cartridge, requiring a manual operation for removing a spent cartridge and inserting a new one for each use, but without needing to open the device each time. This could be advantageous if different animals (requiring different cartridge sizes) are being stunned. The strip preferably mounts up to ten cartridges. Conveniently, the strips may be coupled together for use.

The cap may comprise a cylinder closed at a rear end and having a cap bore in which the barrel is movable. The closed end may have a recess opening into the cap bore to accommodate the firing pin. The closed end also preferably has a through slot in which the strip is inserted, the arrangement being such as to allow the cartridge to protrude into the cap bore to be received in the breech. Opposed apertures in the wall of the cap bore may be provided at each end of the slot to allow passage of the cartridges into and out of the cap bore. The closed end may also mount a handle for the device, and the registration means.

The registration means ensures that each cartridge can be accurately located in the breech of the barrel. This is of course essential for proper operation of the device. The registration means conveniently comprises at least one detent mounted in the cap, and a corresponding recess on the strip. The detent may be urged towards the strip by a resilient means, and engage automatically in the recess as the strip is moved through the barrel. Preferably there are two detents mounted in the cap, one on each side of the breech. This ensures accurate location of the cartridge relative to the breech.

The or each detent preferably has a part-spherical end for engagement with the recess in the strip. Each recess preferably has a corresponding part-spherical or frusto-conical profile. In an embodiment each detent comprises a ball mounted in an axial bore in the cap, urged towards the barrel by a compression spring. The bore may be a blind bore, or have an open end closed by a removable closure member at the rear end of the cap. The forward end of the spring engages the ball, which is preferably of metal, while the rear end engages the end of the bore or the closure member. The provision of the closure member is preferred, as it facilitates cleaning.

The recesses are preferably provided on only one lateral side of the strip. Each recess may be a circular or part-circular aperture, with a frusto-conical profile. This ensures that the detents engage firmly in the recesses, but also that the engagement can be released by application of a manual force to the strip to move it in the slot.

The cap is conveniently formed in two parts, a rearward part having the closed end and a rearward part of the cap bore, and a forward part of hollow cylindrical outline defining intermediate and forward parts of the cap bore. The cap bore is stepped, with the rearward and forward parts being of substantially the same diameter and the intermediate part being of a greater diameter. The resilient means is accommodated in the intermediate part of the cap bore, and engages a step formed between the two cap parts.

The barrel may be formed from three components; a rearward component containing the breech, an intermediate component and a forward stop component. The rearward component is reciprocable in the rearward part of the cap bore, and the intermediate component works in the intermediate and forward parts of the cap bore. The intermediate component has an annulus of greater diameter working in the intermediate part of the cap bore. The annulus has a rear shoulder with which the resilient means engages and a forward shoulder adapted to engage with a step between the intermediate and forward cap bore parts.

Preferably, the barrel has a stepped bore in which the captive bolt is reciprocable. The captive bolt and means for returning it after firing are received in the barrel bore.

The barrel bore has a rearward part formed in the breech component, and in communication with the breech. A rear portion of the bolt is accommodated in the rearward barrel bore part. An intermediate part of the barrel bore is of greater diameter and accommodates a forward portion of the bolt and the means for returning the bolt after firing. The forward stop component is a muzzle cap defining a reduced diameter forward part of the barrel bore. The forward portion of the bolt has an annulus working in the intermediate barrel bore part, and a reduced diameter portion working in the forward part of the barrel bore. The return means for the bolt conveniently comprises a plurality of resilient sleeves accommodated round the reduced diameter portion of the bolt.

In most known stunning devices using a cartridge magazine, the firing pin is moved to strike a relatively stationary cartridge in order to fire it. In the device of the invention the cartridge is moved to strike the relatively stationary firing pin. The strip must therefore accommodate this movement.

Conveniently, the strip is constructed and arranged such that it has sufficient flexibility to allow movement of a cartridge in the breech to strike the firing pin, and sufficient resilience to return the cartridge after firing. The strip may be made of plastics or a sheet metal such as steel.

The cartridge or cartridges are preferably standard brass cartridges. The strip is then formed with a separate aperture for mounting each cartridge. Each aperture preferably has a cylindrical bore for holding the body of the cartridge, and a countersunk part for accommodating the rim. The arrangement is such that the rim is held below the upper surface of the strip to assist in feeding. The apertures are conveniently arranged centrally in the strip. The registration recesses are arranged on one lateral side of the strip. One end of the strip may be formed with a handle, such as a ring, for grasping by the user to facilitate feeding the strip.

According to a second aspect of the invention, we provide a cartridge strip configured for a device for use in the humane slaughter of animals comprising an elongate member of flexible and resilient material having at least one central aperture for mounting a brass cartridge, registration means along one lateral edge and a handle at one end adapted for grasping by a user for manual insertion and removal of the strip from the device.

The strip is particularly adapted for use with a contact fire device, and enables cartridges to be loaded and unloaded from the breech without opening the device, thus simplifying and speeding up operation.

The strip is formed with a separate aperture for mounting each cartridge. Each aperture preferably has a cylindrical bore for holding the body of the cartridge, and a countersunk part for accommodating the rim. The arrangement is such that the rim is held below the upper surface of the strip by a predetermined amount. The apertures are conveniently arranged centrally in the strip in a line. The registration means may comprise recesses arranged on one lateral side of the strip. Each recess may be a circular or part-circular aperture, with a frusto-conical profile. One end of the strip may be formed with a handle, such as a ring, for grasping by the user to facilitate feeding the strip. The other end may be chamfered to assist in insertion of the strip into the device.

BRIEF DESCRIPTION OF THE DRAWINGS

An embodiment of a device showing the various aspects of the invention is illustrated, by way of example, in the accompanying drawings, in which:—

FIG. 1 is a longitudinal section through a device for use in the humane slaughter of animals, according to the first and second aspects of the invention;

FIG. 2 is similar to FIG. 1 and shows the device in a position ready for firing;

DETAILED DESCRIPTION OF THE INVENTION

Figure 3:
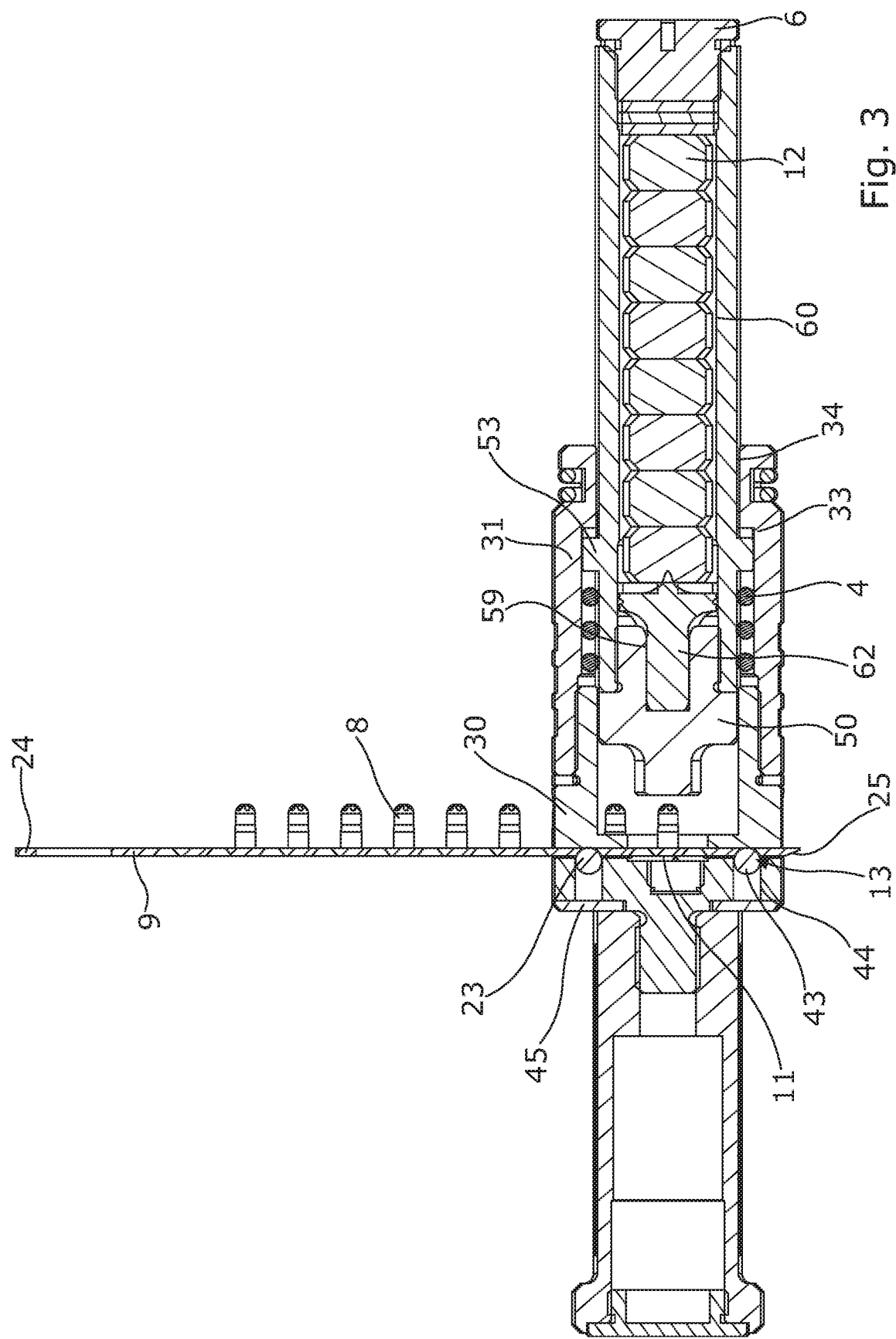
FIG. 3 is similar to FIG. 1, but with the section taken in a plane perpendicular to that of FIG. 1.

FIGS. 1 to 3 show a device 1 for use in the humane slaughter of animals. The device 1 is a captive bolt device of the contact fire type. Such a device is not fired by actuating a manually-operated trigger, but instead is fired by engagement of the forward end of the device with the head of an animal (or other surface).

The device 1 comprises a cap 2 and a barrel 3 arranged for limited reciprocal axial movement, and urged apart by the force in a resilient means comprising a helical compression spring 4. A captive bolt 5 is mounted in the barrel 3 for reciprocal axial movement. The barrel 3 is closed at its forward end by a muzzle cap 6, and at its rearward end is formed with a breech 7 for receiving an explosive cartridge 8 which provides the force for driving the bolt 5 forwards out of the barrel 3.

The cartridge 8 is mounted on a strip 9 containing several other cartridges 8, thus forming a magazine 10. A firing pin 11 for the cartridge 8 is mounted in the cap 2. The cartridge 8 is fired by rearward movement of the barrel 3 relative to the cap 2, which moves the cartridge 8 into the breech 7 to strike the firing pin 11. The firing position is shown in FIG. 2, with the spring 4 compressed.

Explosion of the cartridge 8 drives the bolt 5 forwards out of the barrel 3, and the bolt 5 is returned to the starting position by resilient recuperation sleeves 12 deformed by forward movement of the bolt 5. After firing, the barrel 3 is returned to its starting position of FIG. 1 by the spring 4. The strip 9 is then moved manually to remove the spent cartridge 8 and bring the next cartridge into line with the breech 7. Registration means 13 between the strip 9 and the cap 2, shown in FIG. 3, ensure accurate positioning of the cartridges.

Figure 4:
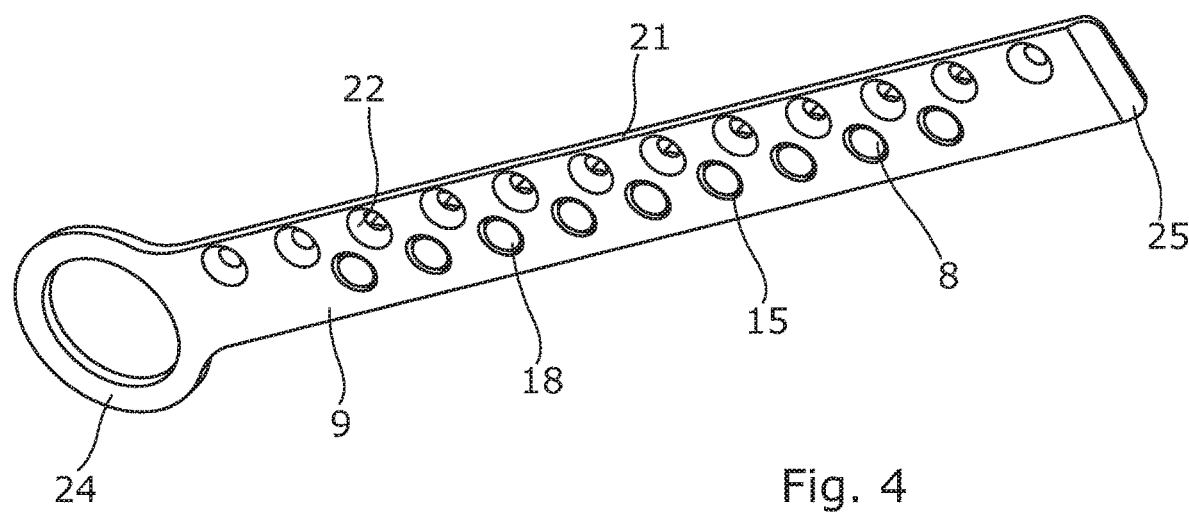
FIG. 4 is a perspective view of the top of a cartridge strip for use in the device of FIGS. 1 to 3, and embodying the second invention.
Figure 5:
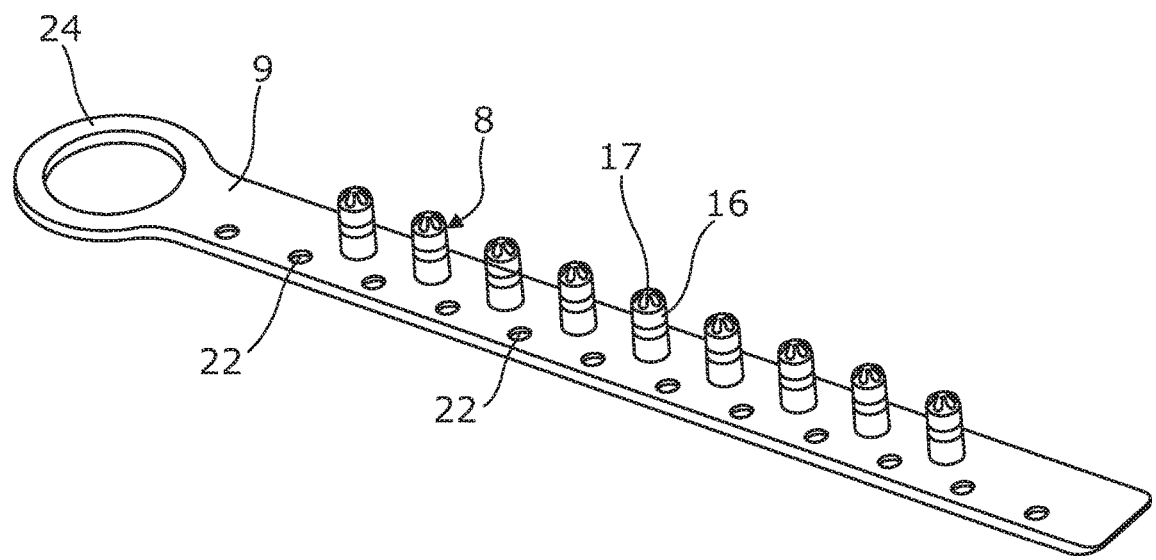
FIG. 5 is a perspective view of the underneath of the strip of FIG. 4.

The cartridge magazine 10 will be described first. As shown in FIGS. 4 and 5, the magazine 10 comprises an elongate strip 9 in which brass cartridges 8 of a known design are mounted. The strip 9 is of a flexible and resilient material, such as plastics or sheet steel. The material and the dimensions of the strip 9 are dictated by the amount of flexibility and resilience required. Thus, the strip 9 must be flexible enough to allow movement of the cartridge 8 with the breech 7 to strike the firing pin 11, and resilient enough to return the cartridge 8 to its original position after firing.

The strip 9 has nine apertures 15 along its centre line, each aperture 15 mounting a brass cartridge 8. Such cartridges 8 have a cylindrical body 16 with a crimped forward end 17 and a slightly enlarged rim 18 at a rearward end. Each aperture 15 has a cylindrical portion 19 opening to the underneath of the strip 9, to accommodate the cylindrical body 16 and a countersunk portion 20 opening to the upper side of the strip 9 to accommodate the rim 18. Each cartridge 8 is mounted such that the flat surface of the rim 18 is below the top of the strip 9 by a given predetermined amount. This facilitates feeding of the strip 9 in the device 1, and ensures that a positive axial movement is required for the rim 18 to strike the firing pin 11. This adds to the safety of the strip 9.

The strip 9 also has part of the registration means 13 adjacent one lateral edge 21. The registration means 13 comprises openings 22 formed one on each side of each cartridge aperture 15, and shaped to engage with detents 23 in the cap 2. The detents 23 form the other part of the registration means 13. As shown, each opening 22 is of circular outline, and has a frusto-conical profile. It will be appreciated that the openings 22 may have any suitable outline and profile to correspond to the detents 23, and may be recesses rather than openings. They may also be arranged nearer to the centre line.

One end of the strip 9 is provided with a handle in the form of a ring 24, for the user to grasp to move the strip 9 through the device 1. It may be moved in either direction. The opposite end 25 of the strip 9 is chamfered to assist initial feeding into the device 1.

The device 1, as shown in FIGS. 1 to 3, 6 and 7, will now be described in more detail.

The cap 2 generally comprises a cylinder closed at a rear end 28 and having a stepped cap bore 29 in which the barrel 3 works. The cap 2 is formed of two parts, 30, 31. The rearward part 30 forms the closed rear end 28 and a rearward part 32 of the cap bore 29. The forward part 31 is of hollow cylindrical outline and defines intermediate and forward parts 33, 34 of the cap bore 29. The rearward part 32 and the forward part 34 of the cap bore 29 are of substantially the same diameter. The intermediate part 33 is of greater diameter. The spring 4 is accommodated in the intermediate part 33, and engages at its rearward end with a step 35 formed between the two cap parts 30, 31.

The rearward part 30 of the cap 2 forming the closed end 28 has a smaller diameter extension 36 projecting rearwardly from the closed end 28. The extension 36 is adapted for attachment of a handle 37 for the device 1. The rearward part 30 also has a recess 38 opening into the end of the cap bore 29. The recess 38 is off centre, and accommodates the firing pin 11. A pair of opposing slots 39 extend from the end of the cap bore 29 to form, with the end of the bore 29, a through slot 40 for the magazine 10. The through slot 40 has portions 41 of rectangular outline to allow passage of the strip 9, and window portions 42 to allow passage of the cartridges 8 through the device 1.

Figure 6:
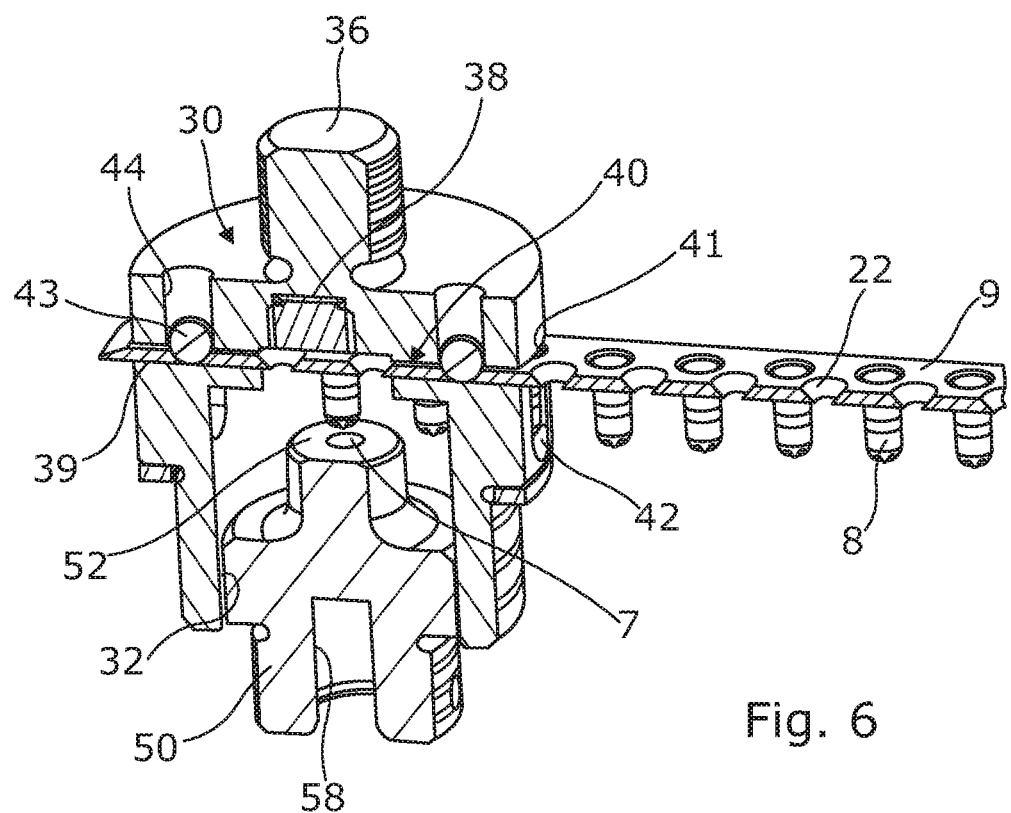
FIG. 6 is a perspective view, part cut away, of a part of the device of FIG. 1.
Figure 7:
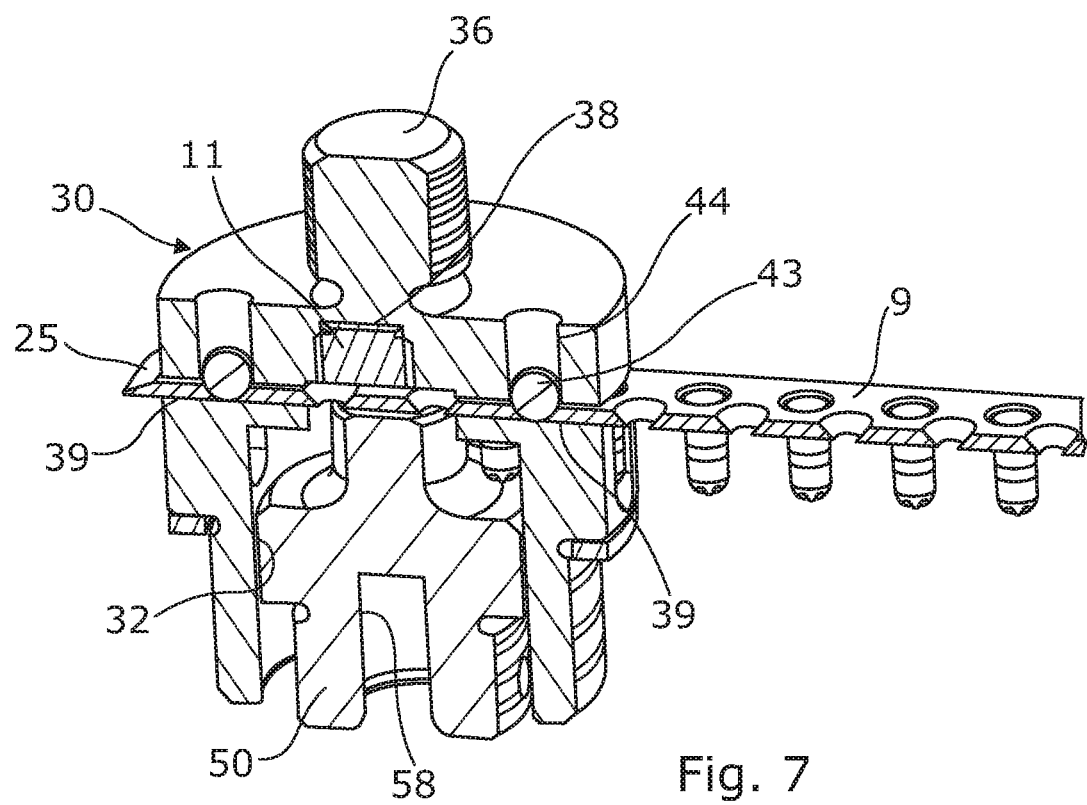
FIG. 7 is similar to FIG. 6, showing the device in the position of FIG. 2.

As best seen in FIG. 3 and FIGS. 6 and 7, the cap part 30 also has part of the registration means 13. This comprises a pair of detents 23 in the form of balls 43, each located in an axial bore 44 in the cap part 30, and urged forwardly by a spring (not shown). The bores 44 are open, and closed at their rearward end by a removable closure member 45, comprising a ring held on the rear annular face 46 of the cap part 30 by the handle 37. The centres of the bores 44 are located on a line parallel to a diameter of the cap bore 29, to align with the openings 22 on the strip 9. The central apertures 15 of the strip 9, however, pass through the device 1 on a diameter of the cap bore 29, to locate them centrally in the bore 29. If a strip 9 is not present in the device 1 the balls 43 engage with the forward face of the respective slot 39. On insertion of a strip 9, the chamfered end 25 engages the balls 43 to move them rearwardly against the force in the springs.

The barrel 3 comprises three components; a rearward breech component 50 containing the breech 7, an intermediate component 51 and the muzzle cap 6. The breech component 50 works in the rearward part 32 of the cap bore 29, and the intermediate component 51 works in the intermediate and forward parts 33, 34 of the cap bore 29. The breech component 50 has a rear face 52 which engages the strip 9 to move the cartridge to strike the firing pin 11. The intermediate component 51 is a hollow cylinder, with an external annulus 53 working in the intermediate part 33 of the cap bore 29. The annulus 53 has a rear shoulder 54 with which the spring 4 engages at its forward end, and a forward shoulder 55 adapted to engage with a step 56 between the intermediate and forward parts 33, 34 of the cap bore 29. The muzzle cap 6 is secured to the forward end of the intermediate component 51.

The barrel 3 has a stepped bore 57 formed in the three components 50, 51, 6. The breech component 50 has a bore portion 58, of which the rearmost part forms the breech 7, which is in communication with the bore portion 32 in the cap 2 in the inoperative position of FIGS. 1, 3 and 6. A forward part 59 is of larger diameter and receives the rearward part of the bolt 5. The intermediate component 51 has a straight bore 60, of greater diameter than the bore part 59, and the muzzle cap 6 has a reduced bore part 61.

The bolt 5 is a single piece of stepped outline. A rear portion 62 works in the forward part 58 of the barrel bore 57, a flange 63 works in the straight bore 60, and a forward portion 64 works in the muzzle cap bore part 61. The recuperation sleeves 12 are mounted round the forward portion 64, between a flange washer 65 and stop washers 66.

Before use, the device 1 is in an inoperative position as shown in FIG. 1, but without a magazine 10 inserted, so that the balls 43 engage the forward faces of the slots 39. The handle 37 may be attached to a swing arm (not shown) to support the device 1 in use.

When it is to be used, the operator inserts a magazine in the slot 40, using the chamfered end 25 to lift the balls 43 against the force in the springs. The magazine 10 is inserted until the balls 43 engage in the first of the registration openings 22 to place the first cartridge 8 in the centre of the bore 29, in line with the breech 7.

The operator then pushes the muzzle cap 6 against the head of an animal to be stunned, to move the barrel 3 rearwardly relative to the cap 2 against the force in the spring 4. This firstly locates the cartridge 8 in the breech 7 and then moves the cartridge to strike the firing pin 11 and explode the cartridge 8. The explosive force in the breech 7 and bore parts 58, 59 urges the bolt 5 forwardly out of the barrel 3, to stun the animal. The movement of the bolt 5 compresses the recuperation sleeves 12.

After firing, the residue from the cartridge 8 leaves through the windows 42. The recuperation sleeves 12 return the bolt 5 to its inoperative position, and the spring 4 returns the barrel 3 and cap 2 to the inoperative position. The strip 9 also returns to its operative position. The operator can then move the magazine 10 through the slot 40 to take the spent cartridge 8 out of line with the breech 7, and place the next cartridge 8 in line for use. When all the cartridges 8 in the magazine 10 have been used, the strip 9 is removed from the slot 40, by pulling in either direction. The arrangement of the balls 43 and openings 22 is chosen so that the balls 43 hold the strip 9 firmly in place for firing, and so that a positive manual force is needed to disengage the balls 43 from the openings 22 to move the magazine 10 in the slot 40. The frusto-conical angle of the openings 22 is chosen accordingly.

It will be appreciated that the arrangement of the magazine 10 enables the device 1 to be used without the need to open it to change the cartridge 8 between each use. It is therefore easier and more efficient in use. Further, the spent cartridges remain on the strip, making handling less hazardous.

The invention claimed is:

1. A device for use in humane slaughter of animals comprising:
    a barrel and a cap arranged for limited reciprocal axial movement;
    wherein the cap comprises a cylinder closed at a rear end and has a cap bore in which the barrel is movable;
    first resilient urging means providing a force urging the barrel and the cap to an inoperative position;
    a captive bolt received in the barrel for reciprocal axial movement;
    wherein the barrel has a breech which is open in the inoperative position and the cap has a firing pin;
    an explosive cartridge received in the breech and fired by striking the firing pin to provide a driving force;
    wherein the bolt is driven out of the barrel by the driving force;
    wherein the cartridge is mounted on a strip moved in response to a manual operation;
    registration means provided between the strip and the cap to locate the cartridge relative to the breech in the inoperative position;
    wherein movement of the barrel relative to the cap against a force of the resilient urging means places the cartridge in the breech and causes the cartridge to strike the firing pin to fire the cartridge and operate the captive bolt; and
    wherein the resilient urging means returns the barrel and the cap to the inoperative position to open the breech and allows movement of the strip to remove the cartridge that has been fired.

2. The device as claimed in claim 1, in which the strip mounts more than one cartridge, to provide a cartridge magazine.

3. The device as claimed in claim 1, in which the closed rear end of the cap has a recess opening into the cap bore to accommodate the firing pin and a through slot in which the strip is inserted, to allow the cartridge to protrude into the cap bore and be received in the breech.

4. The device as claimed in claim 3, in which opposed apertures in a wall of the cap bore are provided at each end of the through slot to allow passage of the cartridges into and out of the cap bore.

5. The device as claimed in claim 1, in which the closed rear end of the cap mounts a handle for the device.

6. The device as claimed in claim 1, in which the registration means comprises at least one detent mounted in the cap, and a corresponding recess on the strip.

7. The device as claimed in claim 6, in which the at least one detent is urged towards the strip by a second resilient urging means, and engages automatically in the corresponding recess as the strip is moved through the device.

8. The device as claimed in claim 7, in which
    the at least one detent has a part-spherical end for engagement with the recess in the strip;
    each recess has a corresponding part-spherical or frusto-conical profile; and
    the at least one detent comprises a ball mounted in an axial bore in the cap, urged towards the barrel by a compression spring comprising the second resilient urging means.

9. The device as claimed in claim 6, in which there are two detents mounted in the cap, one on each side of the breech.

10. The device as claimed in claim 6, in which the at least one detent has a part-spherical end for engagement with the recess in the strip, and each recess has a corresponding part-spherical or frusto-conical profile.

11. The device as claimed in claim 6, in which the corresponding recess is provided on only one lateral side of the strip, and each recess is a circular or part-circular aperture, with a frusto-conical profile.

12. The device as claimed in claim 1, in which
    the cap is formed in two parts including
        a rearward part having the closed rear end and a rearward part of the cap bore; and
        a forward part of hollow cylindrical outline defining intermediate and forward parts of the cap bore;
    wherein the cap bore is stepped, with the rearward and forward parts being of substantially the same diameter and the intermediate part being of a greater diameter.

13. The device as claimed in claim 12, in which the first resilient urging means is accommodated in the intermediate part of the cap bore, and engages a step formed between the rearward and forward cap parts.

14. The device as claimed in claim 1, in which the barrel is formed from three components including
- a rearward component containing the breech;
- an intermediate component; and
- a forward stop component.

15. The device as claimed in claim 14, in which the cap is formed in two parts including
- a rearward part having the closed rear end and a rearward part of the cap bore, and
- a forward part of hollow cylindrical outline defining intermediate and forward parts of the cap bore;
- wherein the cap bore is stepped, with the rearward and forward parts being of substantially the same diameter and the intermediate part being of a greater diameter; and
- the intermediate component of the barrel has an annulus disposed in the intermediate part of the cap bore;
- wherein the annulus has a rear shoulder with which the first resilient urging means engages and a forward shoulder configured to engage with a step between the intermediate and forward cap bore parts.

16. The device as claimed in claim 1, in which
- the barrel has a stepped bore in which the captive bolt is reciprocable;
- the device includes return means for returning the captive bolt after firing; and
- the captive bolt and return means are received in the barrel bore.

* * * * *